(12) United States Patent
Dubus et al.

(10) Patent No.: US 10,550,955 B2
(45) Date of Patent: Feb. 4, 2020

(54) OPERATOR ASSEMBLY AND VALVE EQUIPPED WITH SUCH ASSEMBLY

(71) Applicant: Aktiebolaget SKF, Gothenburg (SE)

(72) Inventors: Jerome Dubus, Aix les Bains (FR); Richardet David, Viviers-du-Lac (FR)

(73) Assignee: Aktiebolaget SKF, Gothenburg (SE)

( * ) Notice: Subject to any disclaimer, the term of this patent is extended or adjusted under 35 U.S.C. 154(b) by 50 days.

(21) Appl. No.: 15/598,957

(22) Filed: May 18, 2017

(65) Prior Publication Data

US 2017/0343129 A1 Nov. 30, 2017

(30) Foreign Application Priority Data

May 25, 2016 (DE) .................. 10 2016 209 061

(51) Int. Cl.
*F16K 31/50* (2006.01)
*F16K 3/00* (2006.01)
*F16K 31/60* (2006.01)

(52) U.S. Cl.
CPC .............. *F16K 31/508* (2013.01); *F16K 3/00* (2013.01); *F16K 31/60* (2013.01)

(58) Field of Classification Search
CPC ...... F16K 31/508; F16K 3/0254; F16K 31/60; F16K 3/00; F16K 31/50; F16K 27/04; F16K 27/044; F16C 2361/91; F16C 19/541–543

See application file for complete search history.

(56) References Cited

U.S. PATENT DOCUMENTS

| 4,341,122 A * | 7/1982 | Lechler ............... G01L 5/0019 73/862.045 |
| 7,303,180 B1 | 12/2007 | O'Shea et al. |
| 7,703,746 B2 * | 4/2010 | Habibvand ............ F16C 19/49 251/306 |
| 9,593,756 B2 * | 3/2017 | Hilker .................... F16H 48/38 |
| 2015/0003764 A1 * | 1/2015 | Kobayashi ............ F16C 25/083 384/447 |

(Continued)

FOREIGN PATENT DOCUMENTS

| CN | 101033812 A | 9/2007 |
| CN | 101220886 | 7/2008 |
| DE | 102007049982 A1 * | 4/2009 ............ F16C 19/182 |

(Continued)

*Primary Examiner* — Marina A Tietjen

(74) *Attorney, Agent, or Firm* — Laurence A. Greenberg; Werner H. Stemer; Ralph E. Locher

(57) ABSTRACT

The invention concerns an operator assembly having a tubular housing extending along a central axis (X1) and a transmission mechanism arranged in an inner bore of the housing and extending along the central axis (X1). The transmission mechanism providing a screw with a threaded outer surface and a nut with a threaded inner surface. The nut is radially mounted around the screw and the inner thread is configured to cooperate with outer thread. The operator assembly further provides angular contact bearings that are radially arranged between the inner bore of the housing and an outer surface of the rotating nut to support in rotation and guide the nut within the housing. The angular contact bearings are axially adjacent and are disposed within an angular contact ball bearing and an angular contact roller bearing.

9 Claims, 4 Drawing Sheets

(56) References Cited

U.S. PATENT DOCUMENTS

2015/0377337 A1* 12/2015 Torii .................... F16C 19/543
74/424.5

FOREIGN PATENT DOCUMENTS

| | | | |
|---|---|---|---|
| DE | 102007055362 A1 | 5/2009 | |
| DE | 102010008434 A1 * | 8/2011 | ............ F16C 19/495 |
| DE | 102013215554 B3 * | 11/2014 | ............. F16C 25/06 |
| EP | 1745221 B1 | 10/2008 | |
| FR | 2365055 A1 * | 4/1978 | ............ B60B 27/00 |
| JP | 53038847 A * | 4/1978 | ............ B60B 27/00 |
| JP | 2004019772 A * | 1/2004 | ............ F16C 19/497 |
| WO | WO 2005110032 A2 * | 11/2005 | ............ F16C 19/497 |
| WO | WO 2009065381 A1 * | 5/2009 | ............ F16C 19/495 |
| WO | WO 2015074702 A1 * | 5/2015 | ......... F16H 25/2252 |
| WO | 2016019983 A1 | 2/2016 | |

* cited by examiner

OPERATOR ASSEMBLY AND VALVE EQUIPPED WITH SUCH ASSEMBLY

CROSS REFERENCE TO RELATED APPLICATIONS

This application claims priority to German patent application no. 102016209061.5 filed on May 25, 2015, the contents of which are fully incorporated herein by reference.

FIELD OF THE INVENTION

The present invention relates to the fields of operator assembly comprising transmission mechanisms to be used in valves and manually operable valves, for instance gate valves, control or regulation valves or choke valves. More particularly, the invention relates to an operator assembly for a gate valve.

BACKGROUND OF THE INVENTION

Valves are used in a variety of industries to control the flow of fluids. In particular, gate valves are used extensively in the oil and gas industry to control the flow of produced fluids at various stages of drilling or production. Most gate valves used in this industry provide a valve body having a longitudinal flow bore and a transverse gate cavity that intersects the flow bore. A gate having an opening extending transversely therethrough is disposed in the gate cavity. A valve stem is provided for moving the gate between an open position, in which the gate opening is aligned with the flow bore, and a closed position, in which the gate opening is offset from the flow bore. The gate cavity of the valve body is covered by a bonnet having an axial bore through which passes the valve stem.

Such a gate valve is associated to a valve operator assembly for selectively driving the valve stem up and down in order to close and open the gate valve. A valve operator assembly generally provides an input member to exert a rotational motion by a manual actuation by a hand-wheel or an electric or pneumatic or hydraulic actuation. The valve operator assembly further provides a transmission mechanism to convert a rotational motion into axial motion of the valve stem. To quickly open and close the gate valve with a minimum number of turns, the transmission mechanism may be a screw mechanism, such as a roller screw mechanism, a ball screw mechanism or an acme screw with or without gear reducer, in order to reduce the operating torque.

BRIEF SUMMARY OF THE INVENTION

The transmission mechanism generally provides a translating element connected to the valve stem and a rotating element connected to the input member, the transmission mechanisms being radially surrounded by a housing. The rotating element may be supported in rotation and axially guided in the housing by rolling bearings.

It is known to use a plurality of angular contact bearings to support in rotation and axially guiding the transmission mechanism in housing. For example, the patent applications WO-A1-2012/087707 or WO-A1-2012/088008 describe valve operator assembly with two angular contact ball bearings. The angular contact bearings in this prior art are axially arranged so as the pressure cones formed by the angular contact lines point radially outwardly from bearings. In other words, the angular contact bearings form an O-arrangement. The advantage of such bearings arrangement is to support axial load in both directions and to stabilize the inner rotating member.

However, the use of only two angular contact ball bearings may be not sufficient in most of the operator assembly applications. Contact surface of balls is not suitable for supporting high loads. Typically, gate valve applications require an arrangement of more than two angular contact ball bearings, for instance 4 axially adjacent ball bearings. Such an operator assembly is not cost effective and not axially compact. Alternatively, a combination of radial and axial bearings can be used.

It is therefore a particular object of the present invention to overcome these aforementioned drawbacks by providing an operator assembly, in particular for valves, that supports and transmits axial and radial loads, of simple design, that is easy to assemble, economical, able to operate for a long time in both an effective and an economic manner.

The invention concerns an operator assembly comprising a tubular housing extending along a central axis, and a transmission mechanism arranged in an inner bore of the housing and extending along the central axis. The transmission mechanism provides a screw with a threaded outer surface and a nut with a threaded inner surface, the nut being radially mounted around the screw, the inner thread being adapted to cooperate with outer thread of the screw. Angular contact bearings are radially arranged between the inner bore of the housing and an outer surface of the rotating nut to support in rotation and guide the nut within the housing.

According to the invention, angular contact bearings are axially adjacent and provide an angular contact ball bearing and an angular contact roller bearing. The angular contact ball bearing provides an inner ring with a concave inner raceway, an outer ring with an concave outer raceway and a row of balls provided between the inner and outer raceways, the raceways being displaced with respect to each other in the direction of the central axis to define an angular contact line with the balls. The angular contact roller bearing provides an inner ring with an inner raceway, an outer ring with an outer raceway, and a row of rollers provided between the inner and outer raceways, the raceways being inclined with respect to the central axis to define an angular contact line with the rollers. Angular contact lines of the bearings define respective pressure cones pointing radially outwardly from the bearings.

According to further aspects of the invention, which are advantageous but not compulsory, such a valve operator assembly may incorporate one or several of the following features as long as there is no contradiction:

The transmission mechanism is a roller screw mechanism wherein rollers are radially provided between the screw and the nut, the rollers comprising each an outer thread cooperating with the inner thread of the nut and with the outer thread of the screw.

The transmission mechanism is a ball screw mechanism wherein balls are radially provided between the screw and the nut, the balls being arranged within the inner thread of the nut and with the outer thread of the screw.

The operator assembly provides a plurality of axially adjacent angular contact ball bearings, contact lines of the angular contact ball bearings being inclined in the same direction.

The operator assembly provides only one angular contact roller bearing.

The angular contact roller bearing is axially maintained between an axial abutment provided on the outer surface of nut on one side and the angular contact ball bearing on the other side. The inner ring of the angular contact roller bearing axially abuts against the axial abutment of nut. The outer ring of the angular contact roller bearing axially abuts against the outer ring of the angular contact ball bearing.

The angular contact ball bearing is axially maintained between an axial abutment provided in the bore of housing on one side and the angular contact roller bearing on the other side. The outer ring of the angular contact ball bearing axially abuts the axial abutment of housing on one side and axially abuts against the outer ring of the angular contact roller bearing on the other side.

The inner ring of the angular contact ball bearing is force fitted on the outer surface of nut.

Axial abutment provided in the bore of housing is a retaining ring secured with the bore by appropriate fixing means.

Axial abutment provided in the bore of housing is a shoulder formed integrally with the housing.

Axial abutment provided on the outer surface of nut is a shoulder formed integrally with the nut.

Axial abutment provided on the outer surface of nut is a retaining ring secured with the outer surface by appropriate fixing means.

The angular contact roller bearing consists in a tapered roller bearing, wherein the raceways are tapered.

The angular contact roller bearing consists in a spherical roller bearing, wherein the raceways are spherical portions.

A spacer is axially interposed between the outer rings of two axially adjacent angular contact bearings.

The spacer is an annular ring mounted in the bore of housing.

The spacer is an inwardly radially projecting step from the inner bore of housing.

The invention also relates to a valve, notably a gate valve, a control or regulation valve or a choke valve comprising a valve body provided with a valve bonnet and a valve housing covered by the bonnet, a valve translating member axially moveable, an operator assembly according to any of the preceding embodiments, the valve translating element being fixed in translation to the translating screw of the transmission mechanism and the valve body being fixed to the housing of operator assembly, and an input member fixed in rotation to the rotating nut of the transmission mechanism.

The valve translating member may be a valve stem or a piston for instance.

As an embodiment, the input member is an operable hand-wheel. Alternatively, the input member is a mechanical operator or a remote operating vehicle.

As an embodiment, the input member is directly connected to the rotating element to transmit rotational movement. Alternatively, an adapter sleeve or any appropriate locking means is mounted to secure the input member with the rotating nut.

As an embodiment, the angular contact ball bearing is axially disposed on the side of the input member and the angular contact roller bearing is axially disposed on the side of the valve bonnet.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which.

DETAILED DESCRIPTION OF THE INVENTION

Figure 1:
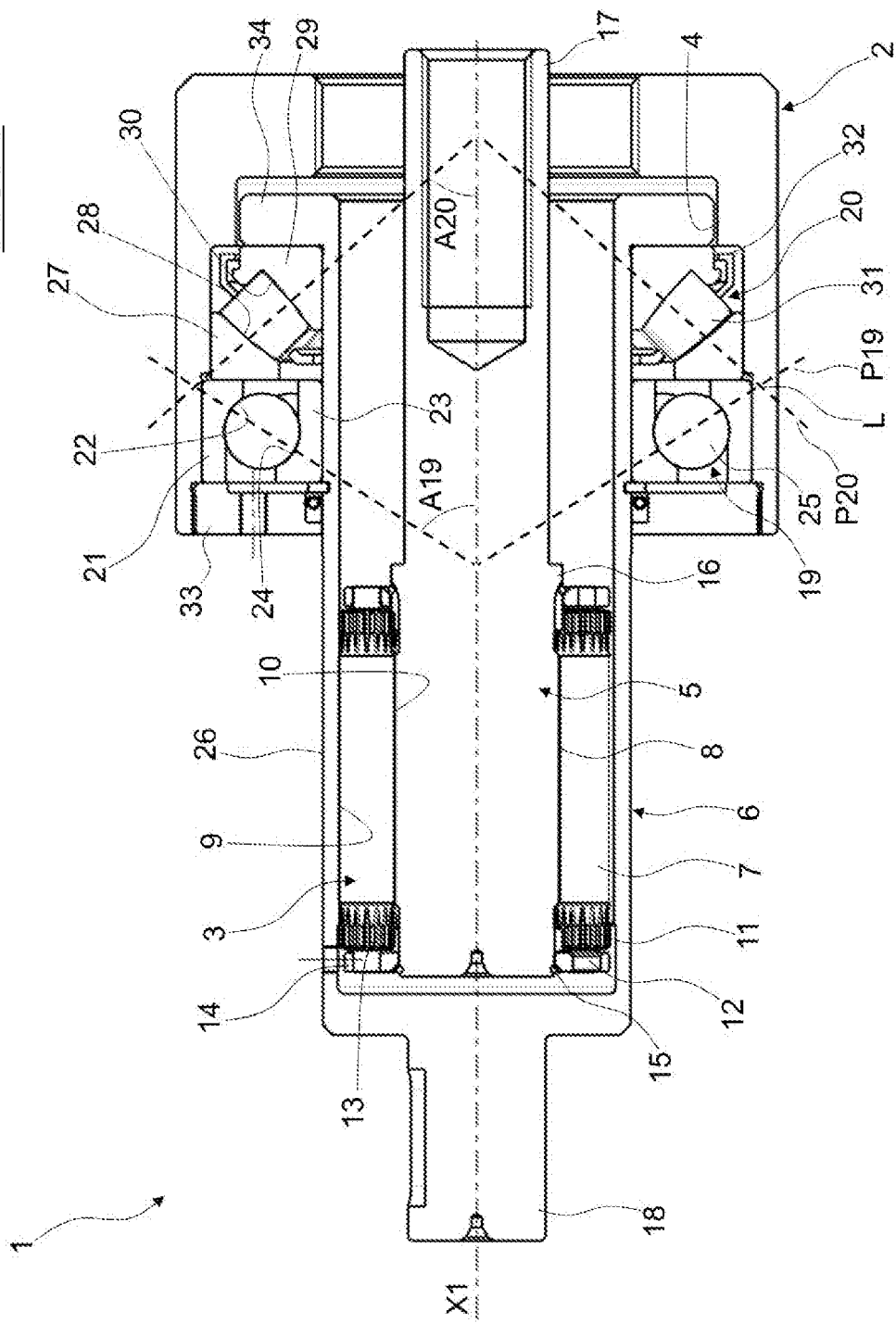
FIG. 1 is a sectional view of an operator assembly according to a first embodiment of the invention.

In FIG. 1, an operator assembly 1, of central axis X1, provides a housing 2 and a transmission mechanism 3. Hereinafter, the adjectives "axial" and "radial" are defined relative to the central axis X1 of the operator assembly 1.

Housing 2 consists in a tubular cylinder provided with a stepped bore 4. Alternatively, the bore 4 may be cylindrical without any step. Housing 2 is centered to the central axis X1.

Transmission mechanism 3 is radially arranged within the bore 4 of housing 2. In the embodiment illustrated in FIG. 1, transmission mechanism 3 is a roller screw mechanism comprising a screw 5, a nut 6 and rollers 7. Screw 5 is provided with a threaded outer surface 8. The nut 6 is mounted coaxially about the screw 5 and is provided with a threaded inner surface 9. A plurality of longitudinal rollers 7 is disposed radially between the screw 5 and the nut 6.

The screw 5 extends longitudinally through a cylindrical bore of the nut 6 on which the threaded inner surface 9 is formed. The nut 6 has a tubular form and is elongated to accommodate the full extent of screw travel.

The rollers 7 are identical to each other and are distributed regularly around the screw 5. Each roller 7 extends along an axis which is parallel with the central axis X1 and provides an outer thread 10 engaging the thread 9 of the nut 6 and the thread 8 of the screw 5. Each roller 7 also provides, at each axial end, outer gear teeth 1 extending axially outwards the outer thread 10 and which are themselves extended axially by a cylindrical stud 12 extending outwards.

The outer gear teeth 11 are meshed by annular gear wheels 13 provided on the outer surface of the screw 5. Each annular gear wheel is axially located near to an end of the threaded outer surface 8 of screw 5, the threaded outer surface 8 being axially located between the gear wheels 13.

The cylindrical studs 12 on axial ends of the rollers 7 are housed in cylindrical through-recesses provided on spacer rings 14 (or annular guides). Spacer rings enable the rollers 7 to be carried and the regular circumferential spacing thereof to be kept. The spacer rings 14 are radially disposed between the screw 5 and the threaded inner surface 9 of nut 6 without contacting with the thread. Each spacer ring 14 is mounted on the outer surface of the screw 5 axially next to an associated gear wheel 13. The spacer rings 14 are hold on the outer surface of the screw 5 by any appropriate means, here for example by a retainer ring 15 on one side and by a shoulder 16 on the axially opposite side.

In the embodiment of FIG. 1, the threaded screw 5 provides a screw connecting portion 17. The screw connecting portion 17 is adapted to be secured to a first external element (not shown) and receive an input movement from the first external element. On the opposite axial side, the tubular cylindrical portion forming the nut 6 is closed on one end and extended by a nut connecting portion 18. The nut connecting portion 18 is adapted to be secured to a second external element (not shown) and transmit an output movement to the external element. As one embodiment, an input rotational movement can be applied from the first external element to the screw 5. Rollers 7 roll on the outer thread 8 of screw 5 and transmit movement to the inner thread 9 of nut 6. The nut 6 axially translates along the central axis X1 and transmits an output translating movement to the second external element. As another embodiment, an input translating movement can be applied from the first external element to the screw 5. Rollers 7 roll on the outer thread 8 of screw 5 and transmit movement to the inner thread 9 of nut 6. The nut 6 rotates relatively to the central axis X1 and transmits an output rotating movement to the second external element.

Figure 4:
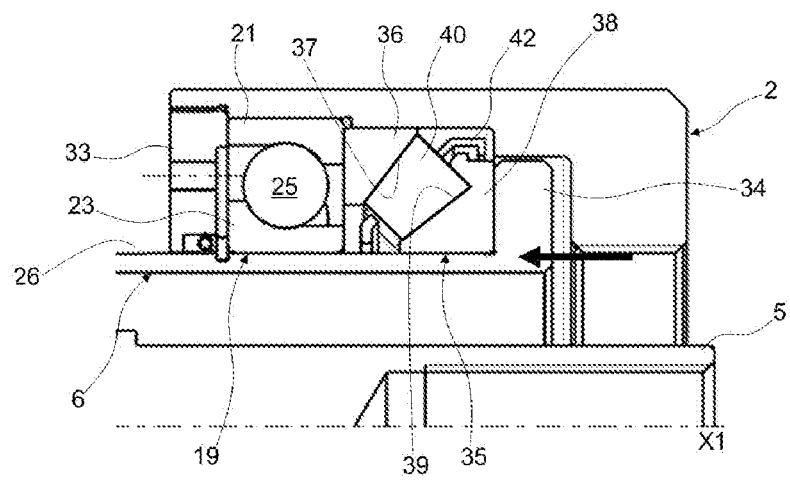
FIG. 4 is a detailed sectional view of an operator assembly according to a third embodiment of the invention.

Alternatively, and as it will be further described in the gate valve of FIG. 4, the nut may be secured to the first external element and receives an input movement and the screw may be connected to the second external element and transmits an output movement.

The valve operator assembly 1 further provides two rolling bearings 19, 20 to guide the rotation of the nut 6 of the roller screw mechanism 3 relative to the housing 2. The rolling bearings 19, 20 are radially mounted between the outer surface of the nut 6 and the stepped bore 4 of housing 2. Rolling bearings 19, 20 are axially adjacent.

According to the invention, a first rolling bearing consists in an angular contact ball bearing 19 comprising an outer ring 21 with a concave outer raceway 22, an inner ring 23 with a concave inner raceway 24 and a row of balls 25 provided between the inner and outer raceways. The raceways 22, 24 are displaced with respect to each other in the direction of the central axis X1 to define a contact line with the balls 25 of angle A19 with the central axis X1.

Angular contact ball bearing 19 is radially mounted between an outer surface 26 of nut 6 and the bore 4 of housing 2. More precisely, the inner ring 23 defines an inner bore wherein the outer surface 26 of nut 6 is arranged. The outer ring 21 defines an outer cylindrical surface fitted into the bore 4 of housing 2.

A second rolling bearing consists in an angular contact spherical roller bearing 20 comprising an outer ring 27 with an outer spherical raceway 28, an inner ring 29 with an inner spherical raceway 30, and a row of rollers 31 provided between the inner and outer raceways. Rollers 31 are carried and regularly circumferentially spaced by an annular cage 32. Raceway 28 is spherical along a given radius R28 with respect to the central axis X1, as illustrated in FIG. 2*b*. Raceway 30 is also spherical and symmetrical to the spherical raceway 28 with respect to rollers 31. Rollers 31 are of matting shape with raceways 28, 30 and elongate along an inclined axis with respect to the central axis X1. Contact line between the raceways 28, 30 and the rollers 31 define an angle A20 with the central axis X1.

Angular contact lines of the bearings 19, 20 define respective pressure cones P19, P20 pointing radially outwardly from the bearings 19, 20 along an annular line L.

A retaining ring 33 is secured in the bore 4 of housing 2 and axially bears against the outer ring 21 of angular contact ball bearing 19. The retaining ring 33 provides an outer thread engaged with a corresponding inner threaded portion provided in the bore 4 of housing 2. Axially on the opposite side, the angular contact spherical roller bearing 20 is axially mounted against a shoulder 34 provided on the outer surface 26 of nut 6, the shoulder 34 radially projecting towards the exterior of the nut 6. The shoulder 34 axially retains the inner ring 29 of the angular contact spherical roller bearing 20 on nut 6. Shoulder 34 is integrally formed with nut 6.

Alternatively, the shoulder may consist in a retaining ring secured to the nut 6 by any appropriate means. In that case, the retaining ring 33 of housing 2 may be replaced by a shoulder integrally formed with the housing 2 and radially projecting from bore 4 towards the central axis X1.

Angular contact bearings 19, 20 are axially adjacent. Angular contact ball bearing 19 is axially blocked between the retaining ring 33 secured with the housing 2 and the angular contact spherical roller bearing 20. Angular contact spherical roller bearing 20 is axially blocked between the angular contact ball bearing 19 and the shoulder 34 protruding from nut 6. More precisely, only the two outer rings 21, 27 of the bearings 19, 20 respectively are contacting each other. The outer ring 21 of angular contact ball bearing 19 forms an axial retainer for the outer ring 27 of angular contact spherical ball bearing 20.

Thanks to the invention, the rolling bearings 19, 20 are able to receive and transmit loads in both axial directions, from the moving nut 6 to the housing 2.

Figure 2A:
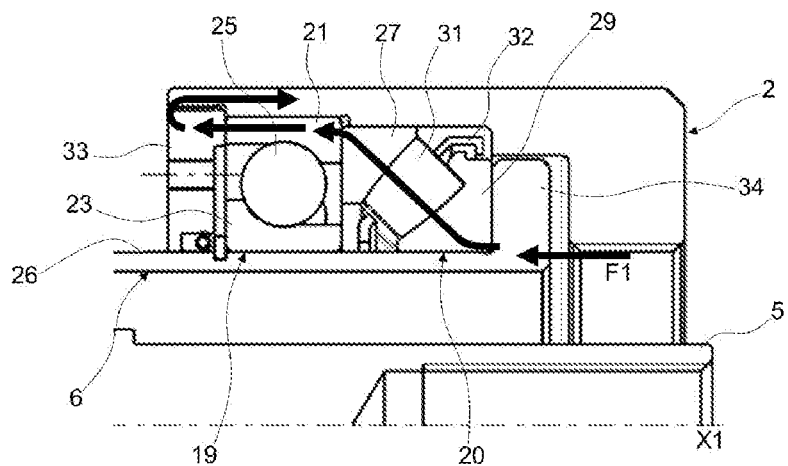
FIGS. 2a and 2b are detailed sectional views of the operator assembly of FIG. 1 showing transmission of axial loads.
Figure 2B:
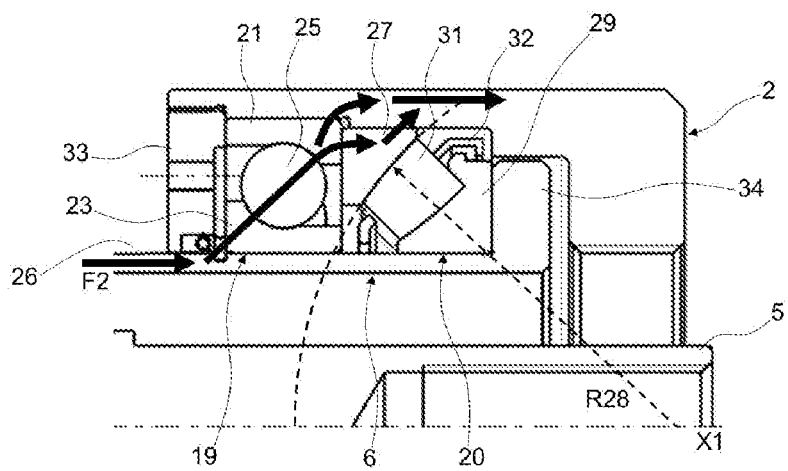

As illustrated in the embodiment of FIG. 2*a*, an axial load F1 is exerted on the nut 6. The load F1 is axially directed from the shoulder 34 towards the opposite end 18. The load F1 is transmitted to the housing 2 by the angular contact bearings 19, 20. More precisely, the load F1 is axially transmitted from the shoulder 34 of nut 6 to the inner ring 29 of angular contact spherical roller bearing 20. The load is transmitted from the inner ring 29 to the outer ring 27 through rollers 31 of the bearing 20 along the angular contact line of pressure cone P20. The load is transmitted from the outer ring 20 of the angular contact spherical roller bearing 20 to the outer ring 21 of the angular contact ball bearing 19. The load is transmitted from the outer ring 21 of the angular contact ball bearing 19 to the retaining ring 33. Load is then transmitted to the housing 2 from the retaining ring 33 through the threaded portions of retaining ring 33 and bore 4 of housing 2 in cooperation.

As illustrated in the embodiment of FIG. 2*b*, an axial load F2 is exerted on the nut 6 in the opposite direction of load F1. The load F2 is transmitted to the housing 2 by the angular contact bearings 19, 20. More precisely, the load F2 is axially transmitted from the outer surface 26 of nut 6 to the inner ring 23 of angular contact ball bearing 19. The load is transmitted from the inner ring 23 to the outer ring 21 through balls 25 of the bearing 19 along the angular contact line of pressure cone P19. The load is partly transmitted from the outer ring 21 of the angular contact ball bearing 19 to the outer ring 27 of the angular contact spherical roller bearing 20 and partly transmitted directly to the housing 2. Residual load is finally transmitted from the outer ring 27 of the angular contact spherical roller bearing 20 to the housing 2.

Thanks to the invention, axial loads in both axial direction can be received and transmit by such a bearing arrangement. Moreover, and as it will be further described in FIG. 4, the specific use of an angular contact ball bearing and an angular contact roller bearing (spherical bearing 19 as illustrated in FIGS. 2*a* and 2*b* or tapered bearing 35 as further illustrated in FIG. 3) is suitable for applications wherein a high load is exerted in one given axial direction and to be received by the roller bearing, and a reduced load is exerted in the other axial direction and to be received by the ball bearing.

Another advantage is that only a fitted assembly is required to assemble the bearings 19, 20 onto the outer surface 26 of nut 6 and into the bore 4 of housing 2. The fitted assembly could be either a force or a loose fit. Advantageously, only two axial abutments 34, 33 can sufficiently receive and transmit loads in both axial directions to the bearings, a first axial abutment 34 against a front surface of the inner ring 29 of the roller bearing 20 and a second axial abutment 33 against a front surface of the outer ring 21 of the ball bearing 19, the outer ring 27 of the roller bearing 20 and the outer ring 21 of the ball bearing 19 being in axial abutment against each other. Ball and roller bearings form axial abutments for each other.

Figure 3:
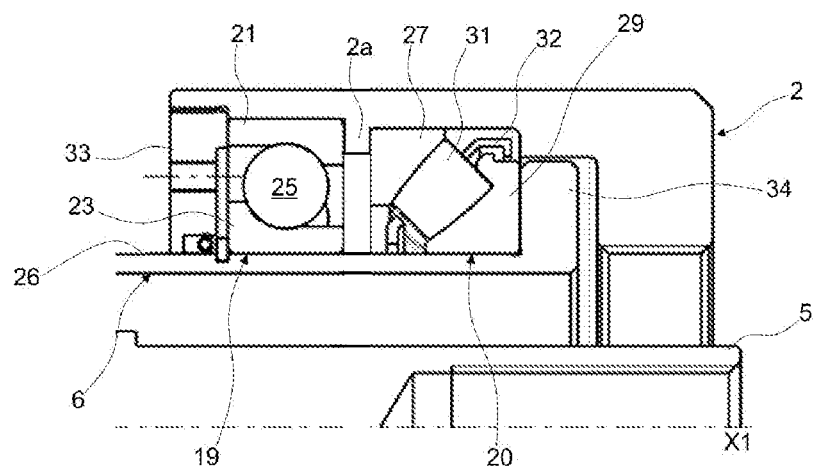
FIG. 3 is a detailed sectional view of an operator assembly according to a second embodiment of the invention.

A second embodiment is illustrated in FIG. 3, wherein the same elements have the same references, and differs from the previous embodiment of FIG. 1 in that a spacer 2*a* is axially interposed between the two angular contact bearings 19, 20 axially adjacent.

Spacer 2*a* is inwardly radially projected from the inner bore 4 of housing 2 towards the axis X1. The spacer 2 is axially in contact against the outer ring 21 of the angular contact ball bearing 19 on one axial side and axially in contact against the outer ring 27 of the angular contact roller bearing 19 on the other axial side.

As an alternate not shown, the spacer 2*a* is an annular ring mounted in the bore 4 of housing 2.

A third embodiment of the invention is illustrated in FIG. 3, wherein the same elements have the same references, and differs from the previous embodiment of FIG. 1 in that the second angular contact bearing is an angular contact tapered roller bearing 35.

First rolling bearing of the second embodiment is similar to the one of the first embodiment, and consists in the angular contact ball bearing 19.

Angular contact tapered roller bearing 35 provides an outer ring 36 with an outer tapered raceway 37, an inner ring 38 with an inner tapered raceway 39, and a row of tapered rollers 40 provided between the inner and outer raceways. Rollers 40 are carried and regularly circumferentially spaced by an annular cage 42. Rollers 40 are of matting shape with raceways 37, 39 and elongate along an inclined axis with respect to the central axis X1. Contact line between the raceways 37, 39 and the rollers 40 define an angle with the central axis X1.

Angular contact ball bearing 19 and angular contact tapered roller bearing 35 are arranged radially between the bore 4 of housing 2 and the outer surface 26 of nut 6, similarly to bearings 19, 20 of the first embodiment illustrated in FIG. 1. The bearings 19, 35 transmit axial loads in both directions from nut 6 to housing 2, similarly to the first embodiment.

In some applications, the advantage of an angular contact tapered roller bearing compared to an angular contact spherical roller bearing is that the contact area between the rollers and the raceways is reduced with tapered raceways. Friction is reduced with angular contact tapered roller bearing. Use of tapered roller bearing would also give other options in terms of bearing size for managing the compactness of the space envelope.

Alternatively, an angular contact spherical roller bearing may be advantageous compared to an angular contact tapered roller bearing with this higher contact surface between the rollers and the spherical raceways, since such spherical roller bearing can support higher loads.

Figure 5:
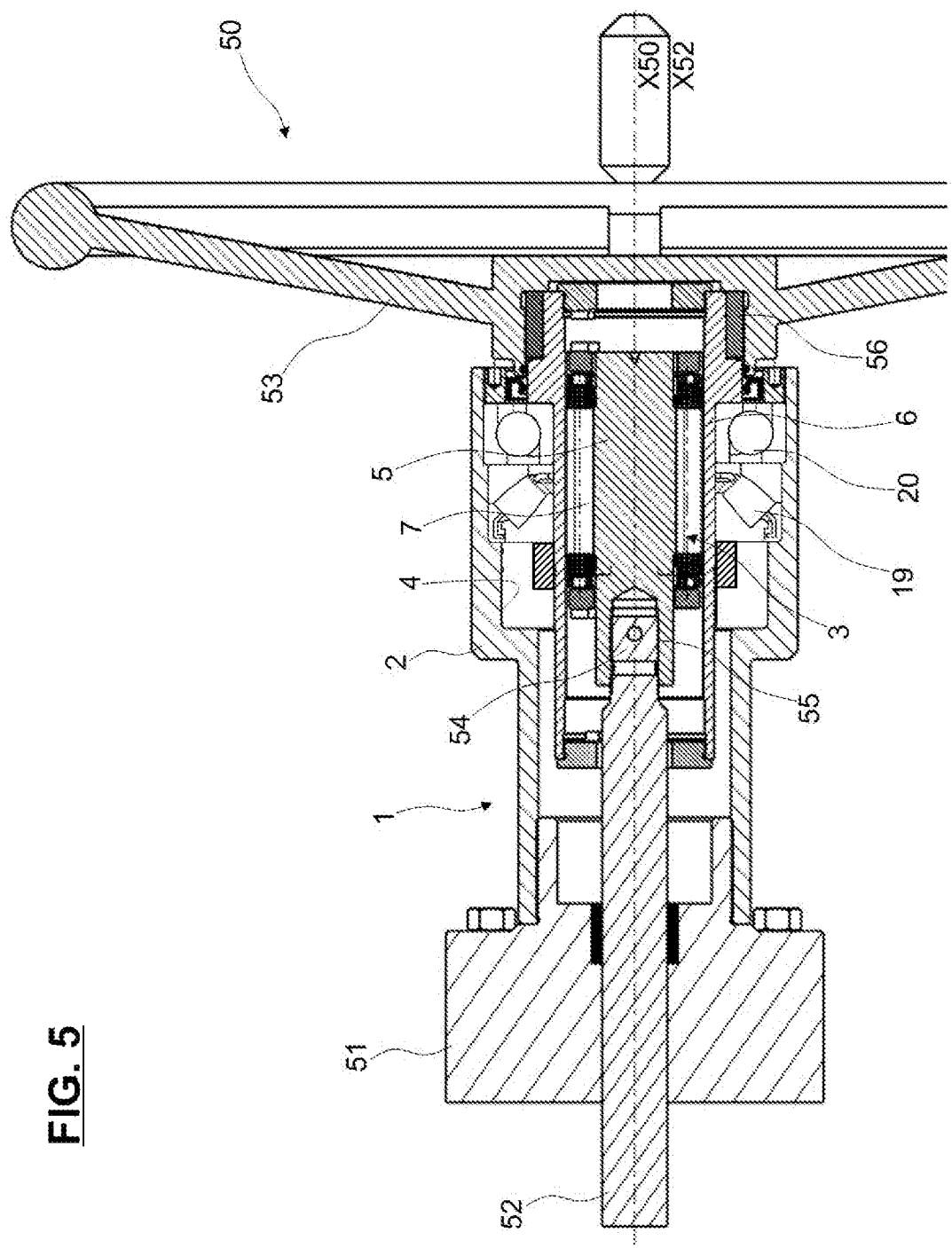
FIG. 5 is a sectional view of a gate valve provided with an operator assembly according to the first embodiment of the invention.

An operator assembly 1 as shown in FIG. 1 may be adapted for a gate valve 50 as illustrated in FIG. 5. The gate valve 50 provides a valve body with a bonnet 51, a valve housing (not shown in the appended drawing) covered by the bonnet and a moveable valve stem 52 of axis X52. Conventionally, the valve body has a flow bore and a transverse gate cavity that intersects the flow bore. The gate valve also provides a gate having an opening extending transversely therethrough is disposed in the gate cavity. The bonnet 51 has a sealing function for the valve body and a fixing function between the gate valve 50 and the valve operator assembly 1.

The valve operator assembly 1 provides the tubular housing 2, an input member 53 rotatably mounted with respect to the housing, and a transmission mechanism 3 as described above. Transmission mechanism 3 is an inverted roller screws mechanism. Transmission mechanism 3 is mounted into the bore 4 of housing 2 and is connected to the input member 53 on one end and to the valve stem 52 of gate valve 50 on the other end.

Axially on the side opposite to the input member 6, a connecting end 54 of valve stem 52 and a connecting end 55 of screw 5 of roller screw mechanism 3 are connected by any appropriate means, for example by threads, welding, glue, a clamp and/or a pin. Any movement of screw 5 is transmitted to the valve stem 52, in particular translating movement to open and close the gate cavity.

Locking means 56 are radially mounted between the input member 54 and the nut 6. Locking means 56 transmits the rotational movement of the input member 54 to the nut 6, and then to actuate the roller screw mechanism 3. As illustrated in the embodiment of FIG. 4, the locking means 56 consist in a plurality of keys circumferentially distributed between recesses provided on an outer portion of the nut and recesses provided in an inner portion of the input member. Alternatively, the locking means may consist in an adapter sleeve axially arranged between the input member and nut or any other appropriate locking means.

The roller screw mechanism 3 is then axially interposed between the input member 54 and the valve stem 52 to convert an input rotational motion of the input member 54 into an output axial motion of the valve stem 52.

Two rolling bearings 19, 20 guide the rotation of the nut 6 of the roller screw mechanism 3 relative to the housing 2. The rolling bearings 19, 20 are radially mounted between the outer surface of the nut 6 and the stepped bore 4 of housing 2. Rolling bearings 19, 20 are axially adjacent. Rolling bearings 19, 20 define pressure cones with an O-arrangement. Rolling bearings consist in an angular contact ball bearing 19 and an angular contact spherical ball bearing 20 as described in the first embodiment and illustrated in FIGS. 2*a* and 2*b*.

In this embodiment, the angular contact ball bearing 19 is axially disposed on the side of the input member 53 and the angular contact spherical roller bearing 20 is axially disposed on the side of the bonnet 51 of valve body.

The advantage of such bearing arrangement is that the angular contact spherical roller screw 20 is able to receive high loads in one given direction and is axially disposed on the side of direct axial loads exerted on the nut 6. The angular contact ball bearing 19 is able to receive axial loads in one given direction but of lower value than an angular contact roller bearing. The angular contact ball bearing 19 is axially disposed on the side of reverse axial loads exerted on the nut 6 which are of lower value than the direct axial loads.

The installation of two angular contact roller bearings is prevented since such an arrangement is expensive, require a specific design of the housing and the outer surface of the nut to maintain the rings, and induce a very high friction torque. The arrangement of an angular contact ball bearing with an angular contact roller bearing permits to support direct loads and reverse loads in both axial directions with a ball bearing of reduced cost and providing a limited friction torque. Moreover, higher load capacity is supported in a compact space envelope.

Although the embodiment of FIG. 4 has been illustrated on the basis of a valve operator assembly for gate valve, it should be understood that the invention can also be used with other types of valves, for instance control or regulation valves or choke valves. The operator assembly may be used for instance with a surface gate or a subsea valve gate which may be actuated by a remote operating vehicle or an actuator.

Although the present invention has been illustrated using a roller screw mechanism as transmission mechanism, it will be understood that the invention can be applied without major modification to valve operator assembly using any other type of transmission mechanism, such as recirculating roller screw mechanism, ball screw mechanism, friction screw mechanism.

The embodiments disclosed in the description may be arranged or combined together and are still within the meaning of the present invention.

The invention claimed is:

1. An operator assembly comprising:
a tubular housing extending along a central axis,
a transmission mechanism arranged in an inner bore of the tubular housing and extending along the central axis, the transmission mechanism having a screw with an outer thread and a nut having an inner thread, the nut being radially mounted around the screw and the inner thread configured to cooperate with outer thread,
angular contact bearings radially arranged between the inner bore of the housing and an outer surface of the rotating nut to rotatably support and guide the nut within the housing, wherein the angular contact bearings are axially adjacent and include:
an angular contact ball bearing having an inner ring with a concave inner raceway, an outer ring with a concave outer raceway and a row of balls provided between the inner and outer raceways, the raceways being displaced with respect to each other in the direction of the central axis to define an angular contact line with the balls, and
an angular contact roller bearing having an inner ring with an inner raceway, an outer ring with an outer raceway, and a row of rollers provided between the inner and outer raceways, the raceways being inclined with respect to the central axis to define an angular contact line with the rollers, the angular contact lines of the bearings defining respective pressure cones pointing radially outwardly from the bearings, the inner ring of the angular contact ball bearing and the inner ring of the angular contact roller being decoupled.

2. The operator assembly according to claim 1, wherein the angular contact roller bearing is axially positioned between an axial abutment provided on the outer surface of the nut on a first side and the angular contact ball bearing on a second side, the inner ring of the angular contact roller bearing being in axial abutment against the axial abutment of the nut and the outer ring of the angular contact roller bearing being in axial abutment against the outer ring of the angular contact ball bearing.

3. The operator assembly according to claim 2, wherein the axial abutment provided on the outer surface of nut is a shoulder formed integrally with the nut.

4. The operator assembly according to claim 1, wherein the angular contact ball bearing is axially positioned between an axial abutment provided in the bore of housing on a first side and the angular contact roller bearing on a second side, the outer ring of the angular contact ball bearing being in axial abutment against the axial abutment of housing on a first side and in axial abutment against the outer ring of the angular contact roller bearing on a second side.

5. The operator assembly according to claim 4, wherein the axial abutment provided in the bore of housing is a retaining ring secured with the bore by appropriate fixing means.

6. The operator assembly according to claim 1, wherein the angular contact roller bearing consists in a tapered roller bearing, and wherein the raceways are tapered.

7. The operator assembly according to claim 1, wherein the angular contact roller bearing consists in a spherical roller bearing, and wherein the raceways are spherical portions.

8. A valve, comprising:
a valve body provided with a valve bonnet, and
a valve housing covered by the bonnet,
a valve translating member axially moveable,
an operator assembly comprising:
a tubular housing extending along a central axis,
a transmission mechanism arranged in an inner bore of the tubular housing and extending along the central axis, the transmission mechanism having a screw with an outer thread and a nut having an inner thread, the nut being radially mounted around the screw and the inner thread configured to cooperate with outer thread,
angular contact bearings radially arranged between the inner bore of the housing and an outer surface of the rotating nut to rotatably support and guide the nut within the housing, wherein the angular contact bearings are axially adjacent and include:
an angular contact ball bearing having an inner ring with a concave inner raceway, an outer ring with a concave outer raceway and a row of balls provided between the inner and outer raceways, the raceways being displaced with respect to each other in the direction of the central axis to define an angular contact line with the balls, and
an angular contact roller bearing having an inner ring with an inner raceway, an outer ring with an outer raceway, and a row of rollers provided between the inner and outer raceways, the raceways being inclined with respect to the central axis to define an angular contact line with the rollers, the angular contact lines of the bearings defining respective pressure cones pointing radially outwardly from the bearings, the inner ring of the angular contact ball bearing and the inner ring of the angular contact roller being decoupled
the valve translating element is fixed in translation to the translating screw of the transmission mechanism and the valve body is fixed to the housing of operator assembly, and
an input member rotatably fixed to the rotating nut of the transmission mechanism, and wherein
the valve is one of a gate, a control, a regulation valve and a choke valve.

9. The valve according to claim 8, wherein the angular contact ball bearing is axially disposed on the side of the input member and the angular contact roller bearing is axially disposed on the side of the valve body.

* * * * *